United States Patent
Inoue et al.

(12) 
(10) Patent No.: US 6,294,005 B1
(45) Date of Patent: Sep. 25, 2001

(54) VACUUM GAS RELEASING SYSTEM

(75) Inventors: Shigekuni Inoue, Tokyo; Kazuhiko Ishimura, Yokohama; Yusuke Takei, Tokyo; Kosei Uchino, Funabashi, all of (JP)

(73) Assignee: Asahi Glass Company Ltd., Tokyo (JP)

(*) Notice: Subject to any disclaimer, the term of this patent is extended or adjusted under 35 U.S.C. 154(b) by 0 days.

(21) Appl. No.: 09/396,360

(22) Filed: Sep. 15, 1999

(30) Foreign Application Priority Data

Sep. 22, 1998 (JP) ................................. 10-268289
Sep. 22, 1998 (JP) ................................. 10-268290

(51) Int. Cl.$^7$ .................................................. B01D 19/00
(52) U.S. Cl. .......................... 96/193; 65/134.2; 65/134.9; 95/266; 96/201
(58) Field of Search ............................. 65/134.2, 134.9, 65/346; 95/246, 266; 96/155, 193, 201, 218

(56) References Cited

U.S. PATENT DOCUMENTS

| | | | |
|---|---|---|---|
| Re. 36,082 | * 2/1999 | Ishimura et al. ...................... | 65/32.5 |
| 2,781,411 | * 2/1957 | Geffcken et al. .................... | 65/134.2 |
| 2,877,280 | * 3/1959 | Eden .................... | 65/134.2 |
| 4,195,982 | * 4/1980 | Coucoulas et al. .................... | 95/266 |
| 5,316,563 | 5/1994 | Ishimura et al. . | |
| 5,849,058 | 12/1998 | Takeshita et al. . | |
| 5,851,258 | 12/1998 | Ando et al. . | |
| 6,036,748 | * 3/2000 | Wallace et al. ......................... | 95/266 |
| 6,119,484 | * 9/2000 | Takei et al. .......................... | 65/134.2 |

FOREIGN PATENT DOCUMENTS 3-33020   2/1991   (JP) .

* cited by examiner

Primary Examiner—Duane S. Smith
(74) Attorney, Agent, or Firm—Oblon, Spivak, McClelland, Maier & Neustadt, P.C.

(57) ABSTRACT

The present invention provides a vacuum degassing system 10 having a leakage valve 48 installed between a condenser 46 and a vacuum pump 44, wherein even when the leakage valve 48 is opened, a vacuum degassing vessel 12 is not released to the atmosphere to thereby constantly maintain a temperature in the vacuum degassing vessel 12; and a large amount of volatile matters in the vacuum degassing vessel 12 are not discharged to a gas release pipe 34, whereby the vacuum degassing vessel 12 can be stably operated.

16 Claims, 3 Drawing Sheets

VACUUM GAS RELEASING SYSTEM

BACKGROUND OF THE INVENTION

1. Field of the Invention

The present invention relates to a vacuum gas releasing system, in particular a vacuum gas releasing system for removing bubbles in a high temperature molten matter, such as molten glass and metal, in a refining process for the high temperature molten matter.

2. Discussion of Background

As a vacuum degassing vessel, vacuum degassing vessels of siphon type, horizontal type, and so on are known. JP-A-3-33020 discloses an example that a vacuum degassing vessel of siphon type is applied.

In JP-A-3-33020, a vacuum degassing apparatus for molten glass mainly consisting of a melting tank, a rise tube, a vacuum degassing vessel, a down comer, and a storage tank. Molten glass, which has not been degassed, is stored in the melting tank, led from the riser tube to the vacuum degassing vessel, and degassed in the vacuum degassing vessel. The degassed molten glass is led from the down comer to the storage tank, and led to a forming process. This is a flow of the molten glass in the above vacuum degassing apparatus for molten glass.

Ordinarily, the vacuum degassing vessel is run under a depressurized state lower than the atmospheric pressure. Therefore, in the vacuum degassing vessel, a sealing mechanism for preventing air from leaking from the atmosphere to the vacuum degassing vessel is provided. However, because the above sealing mechanism can not sufficiently maintain a hermetical condition, leakage still occurs to a certain extent.

Therefore, a vacuum pump is connected to the conventional vacuum degassing vessel through a gas release pipe to suck air as much as a leaked quantity or more from the atmosphere by the vacuum pump for maintaining a degree of depressurizing in the vacuum degassing vessel.

Further, because it is difficult to stably maintain the degree of depressurizing using only the vacuum pump, an atmosphere leakage valve is connected to the vacuum degassing vessel to control an opening degree of the atmosphere leakage valve and the revolutional number of the vacuum pump, whereby the degree of depressurizing is stably maintained.

However, because in the conventional vacuum degassing vessel, the leakage valve is directly connected to the vacuum degassing vessel, there are the following problems. Namely, when the leakage valve is released, an outer air is introduced into the vacuum degassing vessel; a temperature in the vacuum degassing vessel is decreased; and the vacuum degassing vessel is unstably operated. Further, there is a problem that a gas releasing system is troubled and the vacuum degassing vessel is unstably operated because a large quantity of various volatile matters, such as water, SOX gas, carbon generated in the vacuum degassing vessel, are evacuated to the gas release pipe when an outer air passes through the vacuum degassing vessel.

Further, the volatile matters generated in the running vacuum degassing vessel intrudes into the gas release pipe along with a high temperature gas in a state of gas, liquid, and solid, even though the leakage valve connected to the vacuum degassing vessel is closed. Conventionally, there is a problem that the volatile matters chokes the gas release pipe, and resultantly the vacuum degassing vessel is unstably operated.

SUMMARY OF THE INVENTION

It is an object of the present invention to solve the above-mentioned problems inherent in the conventional technique and to provide a vacuum gas releasing system, which can stably operate a vacuum degassing vessel by improving a position of installing a leakage valve and preventing a temperature in the vacuum degassing vessel and the large quantity of volatile matters from changing and discharging.

Another object of the present invention is to provide a vacuum gas releasing system, which can stably operate a vacuum degassing vessel by removing volatile matters generated in the vacuum degassing vessel.

According to a first aspect of the present invention, there is provided a vacuum gas releasing system comprising a vacuum degassing vessel for degassing high temperature molten matters, a vacuum pump for sucking a high temperature gas in the vacuum degassing vessel and reducing a pressure in the vacuum degassing vessel when it is actuated, the vacuum pump is connected to the vacuum degassing vessel through a gas release pipe, a cooling device for cooling the high temperature gas sucked from the vacuum degassing vessel by the vacuum pump, the cooling device is located in the gas release pipe, a leakage valve, attached to the gas release pipe positioned between the cooling device and the vacuum pump, releases the gas release pipe to the atmosphere when it is opened, and a control device for controlling an opening degree of the leakage valve and the revolutional number of the vacuum pump to control a degree of depressurizing of the vacuum degassing vessel. According to this aspect, the vacuum degassing vessel is not released to the atmosphere even though the leakage valve is opened because the leakage valve is located in the gas releasing pipe positioned between the cooling device and the vacuum pump to thereby stably operate the vacuum degassing vessel by constantly maintaining a temperature in the vacuum degassing vessel and avoiding discharge of a large quantity of volatile matters into the gas release pipe; and volatile matters of a high temperature gas sucked by the vacuum pump are diluted with an outer air introduced from the leakage valve to thereby prevent a trouble of a gas releasing system caused by the volatile matters having a high concentration from occurring.

According to a second aspect of the present invention, there is provided a vacuum gas releasing system further comprising a plurality of gas releasing systems including a vacuum pump, a cooling device, a leakage valve and a control device, the gas releasing systems are switchably used, whereby while one gas releasing system is used, the other gas releasing systems can be maintained. Because a released gas from the vacuum degassing vessel contains a substance causing clogging of a gas releasing pipe, it becomes possible to continuously operate the vacuum degassing system and prolong a lifetime of the vacuum degassing system by switching to use the plurality of gas releasing systems.

According to a third aspect of the present invention, there is provided a vacuum gas releasing system further comprising a tank kept to be a vacuum by actuating a vacuum pump located between the vacuum pump and a cooling device, whereby the tank is substitutionally used for the vacuum pump when the vacuum pump is stopped in an emergency. This is because the tank is kept to be a vacuum, the tank has a function of sucking a leaked air, which function is similar to that of the vacuum pump for depressurizing the vacuum degassing vessel. In this case, by locating a shut-off valve between the tank and the vacuum pump so as to shut the tank from the atmosphere by closing the shut-off valve, it is possible to sufficiently demonstrate the above function of the tank.

According to a fourth aspect of the present invention, there is provided a vacuum gas releasing system comprising a vacuum degassing vessel for degassing a high temperature molten matters, a vacuum pump for sucking a high temperature gas in the vacuum degassing vessel through a gas releasing pipe by actuating this and depressurizing the vacuum degassing vessel, which vacuum pump is connected to the vacuum degassing vessel through the gas release pipe, and a volatile matter removing device for removing volatile matters sucked from the high temperature gas in the vacuum degassing vessel by the vacuum pump, which volatile matter removing device is located in the gas releasing pipe, whereby the volatile matters are not clogged in the gas release pipe because the volatile matter removing device is located in the gas release pipe and the volatile matters in the high temperature gas generated by the vacuum degassing vessel are removed by the volatile matter removing device. Thus, the vacuum degassing vessel can be stably operated.

According to a fifth aspect of the present invention, there is provided a vacuum gas releasing system further comprising a dust collector located in a gas release pipe positioned between a volatile matter removing device and a vacuum pump to remove dust in a gas discharged out of the volatile matter removing device, whereby a high pressure gas generated by the vacuum degassing vessel can be purified.

According to a sixth aspect of the present invention, there is provided a vacuum degassing system, wherein a volatile matter removing device is a cooling device, by which volatile matters in a high temperature gas are cooled to be 0° C. and removed, whereby the volatile matters can be securely removed.

According to a seventh aspect of the present invention, there is provided a vacuum degassing system comprising a vacuum degassing vessel for degassing high temperature molten matters, a vacuum pump for sucking a high temperature gas in the vacuum degassing vessel through a gas release pipe and depressurizing the vacuum degassing vessel when it is actuated, which vacuum pump is connected to the vacuum degassing vessel through the gas release pipe, a cooling device for cooling the high temperature gas sucked from the vacuum degassing vessel by the vacuum pump, which cooling device is located in the gas release pipe, a leakage valve for releasing the gas release pipe to the atmosphere by opening this, which leakage valve is attached to the gas release pipe positioned between the cooling device and the vacuum pump, a control device for controlling an opening degree of the leakage valve and the revolutional number of the vacuum pump to adjust a degree of depressurizing of the vacuum degassing vessel, and a volatile matter removing device for removing volatile matters sucked from the high temperature gas in the vacuum degassing vessel by the vacuum pump located in the gas release pipe, wherein the cooling device and the volatile matter removing device may be integrated, in other words, a device for removing the volatile matters in the gas may be located in the gas release pipe for cooling the high temperature gas instead of equipping both of the cooling device and the volatile matter removing device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiment of the present invention in reference to FIGS. 1 through 3 as follows, wherein the same numerical references are used for the same or similar portions and description of these portions is omitted.

Embodiment 1

Figure 1:
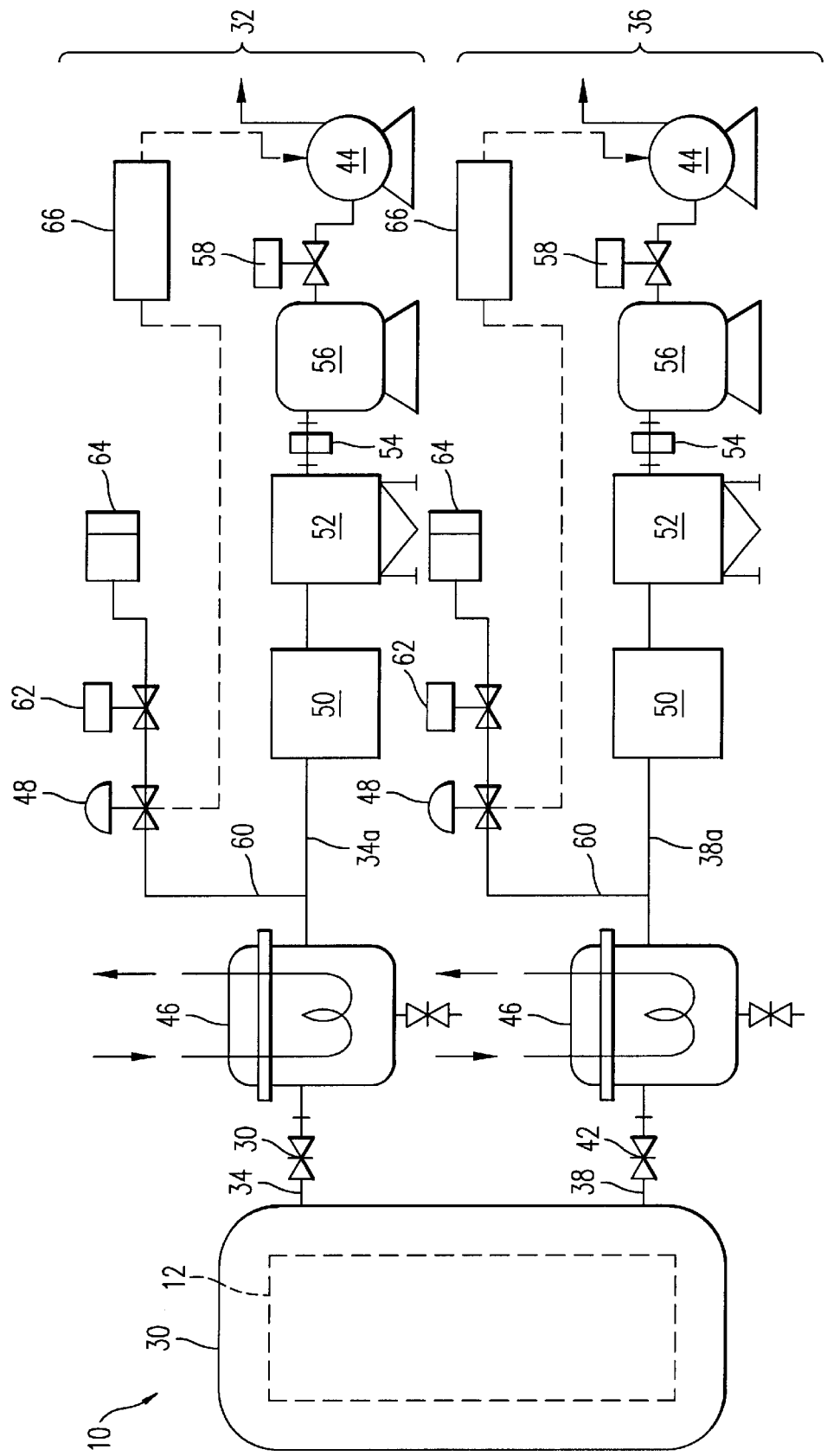
FIG. 1 illustrates an entire structure of a vacuum degassing system according to an embodiment of the present invention.

FIG. 1 illustrates an entire structure of a vacuum degassing system according to an embodiment of the present invention. The vacuum degassing system 10 includes a vacuum degassing vessel 12 as illustrated in FIG. 1. Before describing an important portion of the vacuum degassing system 10, the vacuum degassing vessel 12 will be described.

Figure 2:
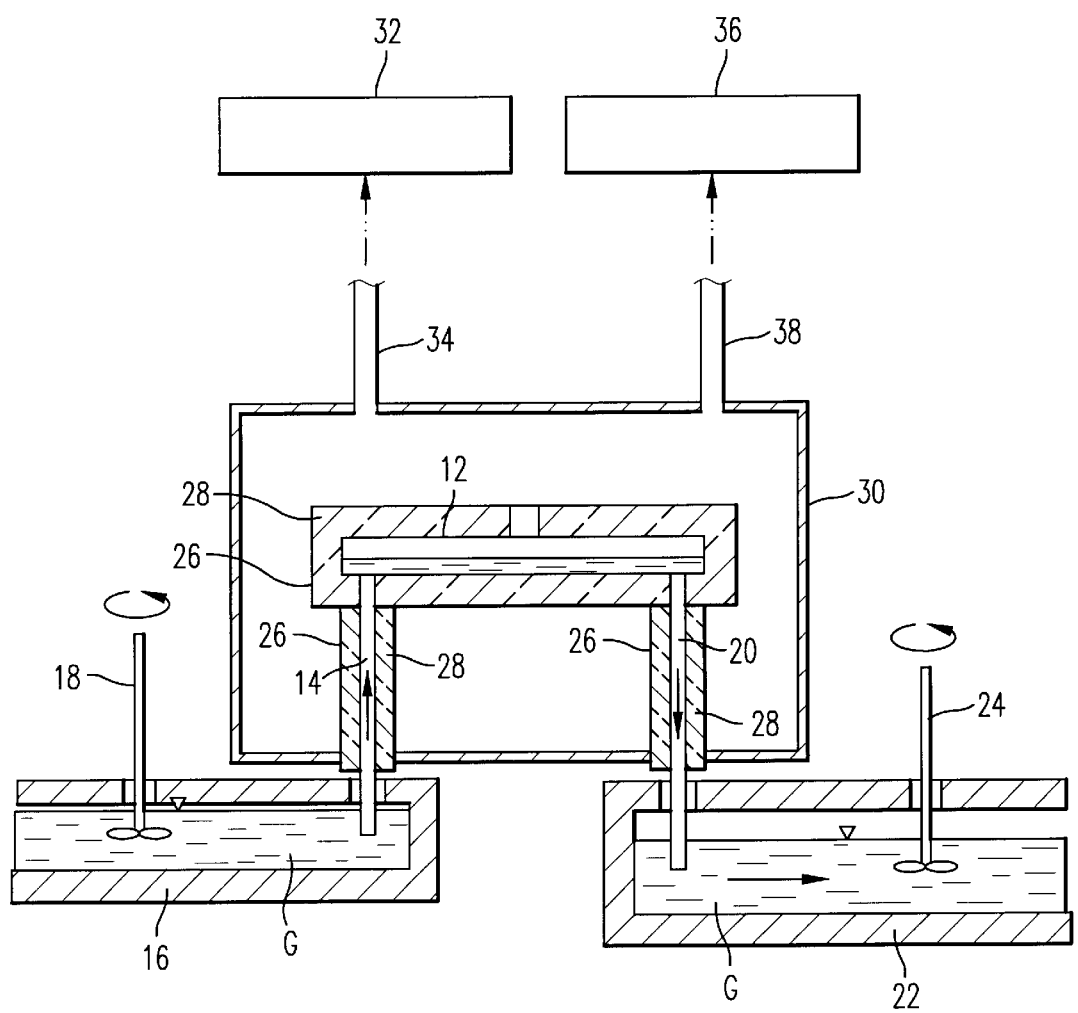
FIG. 2 schematically illustrates a vacuum degassing system in section, to which system a vacuum degassing vessel of siphon type is applied.

As illustrated in FIG. 2, the vacuum degassing vessel 12 is a degassing vessel of siphon type, to a left end of which a riser tube 14 made of platinum is attached, and a bottom end of the riser tube 14 is dipped in a molten glass G stored in a melting tank 16. Further, a stirrer 18 is installed in the melting tank 16. The stirrer 18 is rotated to stir the molten glass G in the melting tank 16. On the other hand, to a right end of the vacuum degassing vessel 12, a down comer 20 is attached, which down comer is made of platinum in a similar manner to that in the riser tube. A bottom end of the down comer 20 is dipped in a molten glass G in a storage tank 22. Also in the storage tank 22, a stirrer 24 for stirring the molten glass G in the storage tank 22 is located.

The riser tube 14, the vacuum degassing vessel 12, and the down comer 20 are heated by an electrically heating device or other heating devices (not shown) and maintained to have a predetermined temperature, for example, about 1,200 through 1,450° C., by a temperature controlling system. Further, the riser tube 14, the vacuum degassing vessel 12, and the down comer 20 are accommodated in a casing 26, in which heat is prevented from dissipating by an insulating material 28 filled among these.

Thus constructed vacuum degassing vessel 12 is surrounded by a vacuum housing 30 made of stainless or steel (SS). A first gas releasing system 32 constituting the vacuum degassing system 10 is connected to the vacuum housing 30 through a gas release pipe, and a second gas releasing system 36 is connected therewith through a gas release pipe 38. When the vacuum degassing vessel 12 is depressurized to a predetermined degree of depressurizing by these gas releasing systems 32, 36, the molten glass G in the melting tank 16 is supplied to the vacuum degassing vessel 12 through the riser tube 14 by a mechanism of siphon and degassed in the vacuum degassing vessel. The degassed molten glass G is introduced into the storage tank 22 and succeedingly introduced into a forming process (not shown). Although a case that the riser tube and the down comer are made of platinum, the invention is not limited thereto, for example the riser tube and the down comer may be made of a material of the vessel; or there may be a case that the stirrer 18 and/or the stirrer 24 is not provided.

Further, although in this embodiment, the vacuum degassing vessel 12 of siphon type is applied, the invention is not limited thereto, for example it is possible to apply to a degassing vessel of horizontal type, such as a melting tank, a vacuum degassing vessel, a storage vessel, of which liquid levels of molten glass are substantially the same. Further, although the vacuum degassing vessel for the molten glass G is exemplified, it may be a vacuum degassing vessel for other high temperature molten matters such as a metal.

In the next, the vacuum degassing system 10 will be described in reference of FIG. 1.

As described, the vacuum degassing system 10 mainly comprises the first gas releasing system 32 and the second gas releasing system 36 in addition to the vacuum degassing vessel 12. The first gas releasing system 32. is connected on a side of the vacuum degassing vessel 12 through a manual valve 40 located in the gas release pipe 34, and the second gas releasing system 36 is similarly connected on the side of the vacuum degassing vessel 12 through a manual valve 42 located in the gas release pipe 38. These gas releasing systems 32, 36 are not ordinarily used at a substantially same time. When one of the gas releasing systems is used, the other is maintained to alternatively switching to use. For example in case that the first gas releasing system 32 is used, the manual valve 40 is opened to interconnect the side of the vacuum degassing vessel 12 to the first gas releasing system 32. The side of the vacuum degassing vessel 12 is shut off from the second gas releasing system 36 by closing the manual valve 42. At this time, the second gas releasing system 36 is maintained to remove dust caused by volatile matters deposited in the gas release pipe 38A or the like of the second gas releasing system 36. As such, by switching to use the first gas releasing system 32 and the second gas releasing system 36, it is possible to continuously operate the vacuum degassing system 10 and prolong a lifetime of the vacuum degassing system 10. Although, in this embodiment, two series of the gas releasing systems 32, 36 are provided, gas releasing systems may be of three series or more or one series.

In the next, the gas releasing systems 32, 36 will be described. Because the gas releasing systems 32, 36 have same structures, the first gas releasing system 32 will be described and a description of the second gas releasing system 36 is omitted by indicating numerical references corresponding to numerical references for the first gas releasing system 32.

The first gas releasing system 32 mainly comprises a vacuum pump 44, a condenser 46 corresponding to a cooling device and a volatile matter removing device, and a leakage valve 48. The condenser 46 is aranged on a most upstream side of the gas release pipe 34. From an upstream side to a down stream side, a chemical spraying device 50, a dust collector 52, a filter 54, a receiver tank 56 (tank maintained to be vacuum by actuating vacuum pump 44), a cut off valve 58, and the vacuum pump 44 are sequentially arranged. Accordingly, when the vacuum pump 44 is actuated, a high temperature gas in the vacuum degassing vessel 12 passes through the condenser 46, the chemical spraying device 50, the dust collector 52, the filter 54, the receiver tank 56, and the cut off valve 58, and the vacuum pump 44 to be finally discharged to the atmosphere.

The leakage valve 48 is located in a branch pipe 60. This branch pipe 60 is connected to a gas release pipe 34A (a gas release pipe 38A on a side of the second gas releasing system 36) positioned between the condenser 46 and the chemical spraying device 50. On a downstream side of the leakage valve 48, a cut off valve 62 and an intake filter 64 are sequentially arranged. Accordingly, because an inside of the gas release pipe 34A is kept to have a negative pressure when the leakage valve 48 is opened, an outer air is introduced through the intake filter 64, the cut off valve 62, and the leakage valve 48. Incidentally, an opening degree of the leakage valve 48 and the revolutional number of the vacuum pump 44 are controlled by a control device 66 so that a degree of depressurizing in the vacuum degassing vessel 12 is constantly maintained.

Incidentally, in the gas releasing system 32 according to this embodiment, the vacuum degassing vessel 12 is operated under a depressurized state lower than the atmospheric pressure. Therefore, various kinds of volatile matters such as water, $SO_x$, gas, carbon in gas, liquid, and solid states, generated in the running vacuum degassing vessel 12, are introduced into the gas release pipe 34 and so on along with a high temperature gas. These volatile matters should be appropriately treated, for example, by installing a removing mechanism for preventing these from depositing in the gas release pipe 34 and so on for realizing a stable operation.

Therefore, in this embodiment, the condenser 46 is installed on a side of the vacuum degassing vessel 12 for cooling the high temperature gas to be a dew point of the volatile matters or less to remove the volatile matters and moisture.

Figure 3:
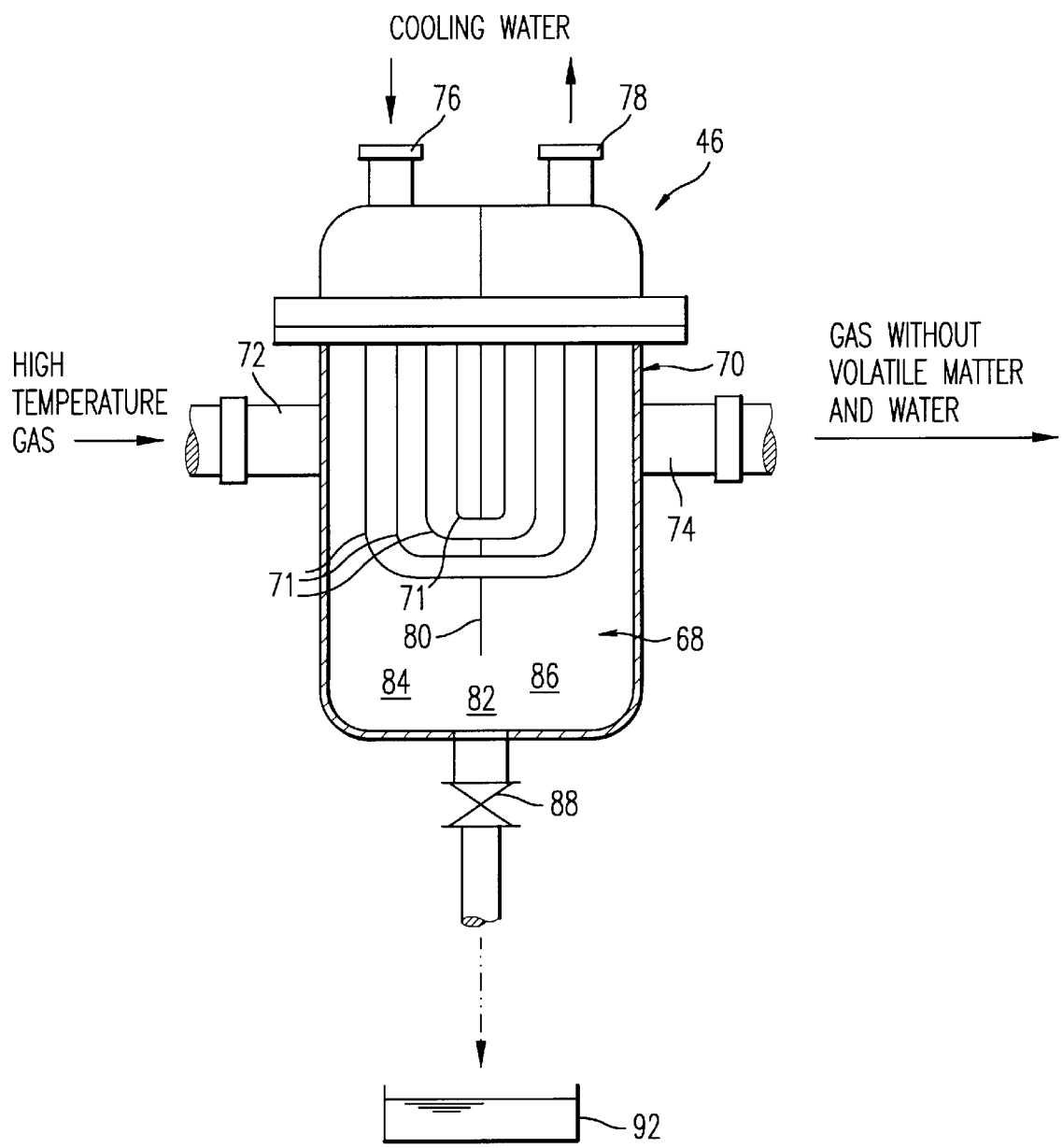
FIG. 3 schematically illustrates an important portion of a condenser illustrated in FIG. 1 in section.

FIG. 3 is a crosssectional view of an important portion of the condenser 46. The condenser 46 includes a casing 70 having a space 68 through which a high temperature gas passes. A plurality of heat exchanging tubes 71, 71, . . . are arranged in the space 68 of the casing 70. On a left side surface of the casing in FIG. 3, an inlet pipe for a high temperature gas is installed. Through the inlet pipe 72, the high temperature gas is introduced into the space 68 of the casing 70 from the vacuum degassing vessel 12. On a right side surface of the casing in FIG. 3, an outlet pipe 74 is installed. On a downstream side of the outlet pipe 74, the chemical spraying device 50 is connected as illustrated in FIG. 1. Accordingly, a gas from which the volatile matters and water are removed is introduced into the chemical spraying device 50.

The tubes 71, 71, . . . illustrated in FIG. 3 are installed so that a central portion of the tubes dangles. Both ends of the tubes 71, 71, . . . are respectively bound, wherein one of the ends connected to an inlet pipe of cooling water 76 and the other end is connected to an outlet pipe of cooling water 78. The inlet pipe of cooling water 76 is connected to a cooling source (not shown) through a supplying pipe of cooling water being a coolant, and the outlet pipe of cooling water 78 is connected to the cooling source through a discharging pipe (not shown). The cooling water circulates through the cooling source and the condenser 46. The coolant is not limited to water.

Meanwhile, a shield 80 is danglingly installed in the space 68 of the casing 70. The space 68 is separated into a left room 84 and a right room 86 by the shield 80, the rooms are connected through a lower area 82. By installing such a shield 80, a high temperature gas introduced from the inlet pipe 72 flows through the left room 84 as a downstream flow, turns into the right room 86 through the lower area 82, flows through the right room 86 as an upstream flow, and is discharged from the outlet pipe 74 on a downstream side. Accordingly, because the length of a passage flow of high temperature gas is elongated in the space 68, having a limited volume, by installing the shield 80, it is possible to efficiently exchange heat with the high temperature gas. Therefore, the volatile matters and water can be efficiently removed. A valve 88 opens a lower opening 70A of the casing 70. When the lower opening 70A is opened by the valve 88, a mixed liquid of the volatile matters and water removed by the condenser 46, which are accumulated in the casing 70, is discharged into a drain pan 92.

The chemical spraying device 50 illustrated in FIG. 1 is a device for removing acidic matters in a gas passed through the condenser 46. The chemical spraying device 50 includes a nozzle for spraying a neutralizer such as caustic soda, soda ash and light ash, wherein by spraying the neutralizer from this nozzle, the acidic matters, such as sulfuric acid, are removed from the gas. By installing such chemical spraying device 50, it is possible to protect the gas releasing pipe 34, the vacuum pump 44, and so on, positioned on a downstream side of the chemical spraying device 50, from the acidic matters.

The gas discharged from the chemical spraying device 50, namely a gas from which the acidic matters are removed, is introduced into a dust collector 52. Solid matters, such as a carbon powder, in the gas are roughly removed by the dust collector. The gas discharged from the dust collector 52, a gas including the carbon powder of finely divided particles passes through the filter 54 so that the finely divided particles are finally removed. Thus, the high temperature gas discharged from the vacuum degassing vessel 12 is completely purified. Then, purified gas is discharged to the atmosphere from the vacuum pump after passing thorough the receiver tank 56 and the cut off valve 58.

The receiver tank 56 is maintained to be substantially vacuum when the vacuum pump 44 is operated, the receiver tank 56 is convenient when the vacuum pump 44 is stopped in emergency by a trouble or the like. This means that the receiver tank 56 demonstrates a function of sucking a leaked air in a similar manner to that in the vacuum pump 44 and depressurizes the vacuum degassing vessel 12. At this time, the cut off valve 58 is closed to cut off the receiver tank 56 from the atmosphere. While the receiver tank 56 is functioning, the vacuum pump 44 can be repaired. By such a structure, even when the vacuum pump 44 is stopped in emergency, it is possible to continuously operate the vacuum pump 34. In this, the cut off valve 58 is an electromagnetic valve, which is controlled to close when the vacuum pump 44 is stopped in emergency.

On the other hand, the leakage valve 48 is an electric operated valve, and an opening degree of the valve is controlled by the control device 66. When the leakage valve 48 is released by the control device 66, an outer air is sucked from the intake filter 64 and the outer air is introduced into the gas release pipe 34A through the cut off valve 62 and the leakage valve 48. An opening degree of the leakage valve 48 for determining the quantity of introducing outer air and the revolutional number of the vacuum pump 44 are controlled by the control device 66. Thus, a degree of depressurizing of the vacuum degassing vessel 12 is constantly maintained. The cut off valve 62 is an electromagnetic valve which is controlled to close when the vacuum pump 44 is stopped in emergency in a similar manner to than in the cut off valve 58.

According to the vacuum degassing system 10 of this embodiment, because the leakage valve 48 is located in the gas release pipe 34A positioned between the condenser 46 and the chemical spraying device 50, a temperature in the vacuum degassing vessel 12 is constantly maintained even when the leakage valve 48 is opened, wherein the large quantity of the volatile matters are not discharged to the gas release pipe 34.

Accordingly, in the vacuum degassing system 10, it is possible to stably operate the vacuum degassing vessel 12. Further, the volatile matters of the high temperature gas sucked by the vacuum pump 44 is diluted by the outer air introduced from the leakage valve 48, it is possible to prevent a trouble of the gas releasing system caused by the volatile matters having a high concentration from occurring.

Although, in this embodiment, the leakage valve 48 is located between the condenser 46 and the chemical spraying device 50, the present invention is not limited to such a structure. For example, the leakage valve may be located between the vacuum degassing vessel 12 and the condenser 46 or between the chemical spraying device 50 and the vacuum pump 44. However, from the viewpoint of constantly keeping a temperature of the vacuum degassing vessel 12, it is desirable that the leakage valve 48 is located on a downstream side of the condenser 46. Or, from the viewpoint of reducing a load to the chemical spraying device 50 and the dust collector 52, it is desirable that the leakage valve 48 is located on an upstream side of the chemical spraying device 50. In other words, by locating the leakage valve 48 on the upstream side of the chemical spraying device 50, the volatile matters in the high temperature gas can be diluted by an outer air, whereby it is possible to reduce a load of the chemical spraying device 50 and the dust collector 52. Accordingly, a most preferable position of attaching the leakage valve 48 is between the condenser 46 and the chemical spraying device 50 as illustrated in FIG. 1.

Further, according to the constructed vacuum degassing system 10 of this embodiment, the condenser 46 is provided in the vacuum degassing system 10; and the volatile matters in the high temperature gas, generated by the vacuum degassing vessel 12, are removed by the condenser 46, whereby the volatile matters do not clog the gas release pipes 34, 38. Accordingly, the vacuum degassing system 10 and the vacuum degassing vessel 12 are stably operated in the present invention.

Further, because the dust collector 52 is installed in the pipe 34 positioned between the condenser 46 and the vacuum pump 44; and noxious matters in the gas discharged from the condenser 46 are removed, the high temperature gas generated by the vacuum degassing vessel 12 can be purified. Further, devices on a downstream side of the dust collector 52 such as the filter 54, the receiver tank 56, the cut off valve 58, and the vacuum pump 44 are protected from the noxious matters.

The first advantage of a vacuum degassing system according to the present invention is that a vacuum degassing vessel is stably operated.

The second advantage of a vacuum degassing system according to the present invention is that a trouble of a gas releasing system caused by volatile matters having a high concentration is prevented from occurring.

The third advantage of a vacuum degassing system according to the present invention is that a high temperature gas generated by a vacuum degassing vessel is purified.

Obviously, numerous modifications and variations of the present invention are possible in light of the above teachings. It is therefore to be understood that within the scope of the appended claims, the invention may be practiced otherwise than as specifically described herein.

What is claimed is:

1. A vacuum degassing system comprising:
   a vacuum degassing vessel for degassing high temperature molten matters;
   a vacuum pump for sucking a high temperature gas in said vacuum degassing vessel through a gas release pipe and depressurizing said vacuum degassing vessel when this pump is actuated, which vacuum pump is connected to said vacuum degassing vessel through said gas release pipe;
   a cooling device which cools the high temperature gas sucked from said vacuum degassing vessel by said vacuum pump, which cooling device is installed in said gas release pipe;
   a leakage valve for releasing said gas release pipe to the atmosphere by opening this valve, which leakage valve is attached to said gas release pipe positioned between said cooling device and said vacuum pump; and a control device for adjusting a degree of depressurizing of said vacuum degassing vessel by controlling an opening degree of said leakage valve and the revolutional number of said vacuum pump.

2. The vacuum degassing system according to claim 1, further comprising:

a plurality of gas releasing systems including said vacuum pump, said cooling device, said leakage valve, and said control device, wherein said gas releasing systems are switchably used.

3. The vacuum degassing system according to claim 1, further comprising:

a tank maintained to be vacuum upon actuation of said vacuum pump installed in a part of said gas release pipe positioned between said vacuum pump and said cooling device; and a cut off valve installed in a part of said gas release pipe positioned between said tank and said vacuum pump.

4. A vacuum degassing system comprising:

a vacuum degassing vessel for degassing high temperature molten matters;

a vacuum pump for sucking a high temperature gas in said vacuum degassing vessel through a gas release pipe and depressurizing said vacuum degassing vessel when this pump is actuated, which vacuum pump is connected to said vacuum degassing vessel through said gas release pipe; and a volatile matter removing device for removing volatile matters in the high temperature gas sucked from said vacuum degassing vessel by said vacuum pump, said volatile matter removing device being installed in said gas release pipe and including a casing having a inner space, a heat exchanging unit provided inside the inner space and a shield dividing the inner space into two compartment communicating at a lower portion of the shield.

5. The vacuum degassing system according to claim 4, further comprising:

a dust collector for removing dust in a gas discharged from said volatile matter removing device, which dust collector is installed in said gas release pipe positioned between said volatile matter removing device and said vacuum pump.

6. The vacuum degassing system according to claim 4, wherein said volatile matter removing device removes the volatile matters in the high temperature gas by cooling these matters to a dew point or lower.

7. A vacuum degassing system comprising:

a vacuum degassing vessel for degassing high temperature molten matters;

a vacuum pump for sucking a high temperature gas in said vacuum degassing vessel through a gas release pipe and depressurizing said vacuum degassing vessel when this pump is actuated, which vacuum pump is connected to said vacuum degassing vessel through said gas release pipe;

a cooling device for cooling a high temperature gas sucked from said vacuum degassing vessel by said vacuum pump, which cooling device is installed in said gas release pipe;

a leakage valve for releasing said gas release pipe to the atmosphere by opening, which leakage valve is attached to said gas release pipe positioned between said cooling device and said vacuum pump;

a control device for adjusting a degree of depressurizing of said vacuum degassing vessel by controlling an opening degree of said leakage valve and the revolutional number of said vacuum pump; and a volatile matter removing device for removing volatile matters in the high temperature gas sucked from said vacuum degassing vessel by said vacuum pump, which volatile matter removing device is installed in said gas release pipe.

8. The vacuum degassing system according to claim 1, wherein the vacuum degassing vessel is configured to degas molten glass.

9. The vacuum degassing system according to claim 2, wherein the vacuum degassing vessel is configured to degas molten glass.

10. The vacuum degassing system according to claim 3, wherein the vacuum degassing vessel is configured to degas molten glass.

11. The vacuum degassing system according to claim 4, wherein the vacuum degassing vessel is configured to degas molten glass.

12. The vacuum degassing system according to claim 5, wherein the vacuum degassing vessel is configured to degas molten glass.

13. The vacuum degassing system according to claim 6, wherein the vacuum degassing vessel is configured to degas molten glass.

14. The vacuum degassing system according to claim 7, wherein the vacuum degassing vessel is configured to degas molten glass.

15. The vacuum degassing system according to claim 4, wherein said volatile matter removing device comprises a valve configured to discharge the volatile matters accumulated in the casing.

16. The vacuum degassing system according to claim 4, wherein said heat exchanging unit comprises a plurality of heat exchanging tubes.

* * * * *